US009576494B2

(12) United States Patent
Vattikonda et al.

(10) Patent No.: US 9,576,494 B2
(45) Date of Patent: Feb. 21, 2017

(54) RESOURCE RESOLVER

(71) Applicant: Apollo Education Group, Inc., Phoenix, AZ (US)

(72) Inventors: Narender Vattikonda, San Jose, CA (US); Shridhar Navanageri, Sunnyvale, CA (US); Sudhakar Subashchandrabose, San Jose, CA (US); Raghavendra Reddy, Sunnyvale, CA (US); Anil Maipady, San Jose, CA (US)

(73) Assignee: Apollo Education Group, Inc., Phoenix, AZ (US)

( * ) Notice: Subject to any disclaimer, the term of this patent is extended or adjusted under 35 U.S.C. 154(b) by 120 days.

(21) Appl. No.: 14/167,821

(22) Filed: Jan. 29, 2014

(65) Prior Publication Data
US 2015/0213723 A1 Jul. 30, 2015

(51) Int. Cl.
*G09B 5/00* (2006.01)
*H04L 29/08* (2006.01)
(Continued)

(52) U.S. Cl.
CPC ............ *G09B 5/00* (2013.01); *G06F 17/2264* (2013.01); *G06F 17/289* (2013.01);
(Continued)

(58) Field of Classification Search
CPC ............ G09B 5/00; G09B 5/12; G09B 21/00; G09B 21/001; G09B 21/009; G06F 17/30569; G06F 17/03569; G06F 17/211; H04L 67/02
See application file for complete search history.

(56) References Cited

U.S. PATENT DOCUMENTS 5,727,950 A 3/1998 Cook et al.
5,957,699 A 9/1999 Peterson et al.
(Continued)

FOREIGN PATENT DOCUMENTS

EP 2524362 A1 11/2012
JP 200509914 A 4/2005
(Continued)

OTHER PUBLICATIONS

Mexican Institute of Industrial Property Patent Branch, "Examination Report" in application No. MX/a/2012/00206, dated May 16, 2014, 4 pages.
(Continued)

*Primary Examiner* — Peter Egloff
(74) *Attorney, Agent, or Firm* — Hickman Palermo Becker Bingham LLP

(57) ABSTRACT

An automated resource resolver system receives a client request for a learning resource. The system selects a format for a target resource, to be delivered to the client device, based on user information and context information for the client device. Thus, the selected format will be accessible by the client device, utilizing the capabilities of the device, and will be the best-fit format for the user. After the system selects the format, the system determines whether the target resource stored at a resource repository is in the selected format. If not, then the system selects an instance of the target resource, not in the selected format, to convert to the selected format. The system converts the selected resource instance to produce an instance of the target resource that is in the selected format. The system makes the target learning resource, in the selected format, available to the client device.

22 Claims, 3 Drawing Sheets

(51) Int. Cl.
  *G06F 17/22* (2006.01)
  *G06F 17/28* (2006.01)
  *G06F 17/30* (2006.01)
  *G09B 21/00* (2006.01)

(52) U.S. Cl.
  CPC .. *G06F 17/30867* (2013.01); *G06F 17/30893* (2013.01); *G06F 17/30899* (2013.01); *G09B 21/005* (2013.01); *H04L 67/02* (2013.01)

(56) References Cited

U.S. PATENT DOCUMENTS

| | | |
|---|---|---|
| 6,146,148 A | 11/2000 | Stuppy |
| 6,149,441 A | 11/2000 | Pellegrino et al. |
| 6,301,462 B1 | 10/2001 | Freeman et al. |
| 6,334,779 B1 | 1/2002 | Siefert |
| 6,505,031 B1 | 1/2003 | Slider et al. |
| 7,165,054 B2 | 1/2007 | Geoghegan |
| 7,565,411 B1* | 7/2009 | Turcotte ............ G06F 17/30241 342/357.52 |
| 7,590,604 B2 | 9/2009 | Geoghegan |
| 7,677,896 B1 | 3/2010 | Sonwalkar |
| 8,182,270 B2 | 5/2012 | Ezinga |
| 8,751,466 B1* | 6/2014 | Tsay ................ G06F 17/30864 707/700 |
| 2001/0031456 A1 | 10/2001 | Cynaumon et al. |
| 2002/0142278 A1 | 10/2002 | Whitehurst et al. |
| 2002/0188583 A1* | 12/2002 | Rukavina ............ G09B 7/00 706/45 |
| 2002/0192629 A1 | 12/2002 | Shafrir |
| 2003/0003433 A1 | 1/2003 | Carpenter et al. |
| 2003/0039948 A1 | 2/2003 | Donahue |
| 2004/0202987 A1 | 10/2004 | Scheuring et al. |
| 2005/0042593 A1* | 2/2005 | Hopkins ............ G09B 5/00 434/350 |
| 2005/0058978 A1 | 3/2005 | Benevento |
| 2005/0069094 A1* | 3/2005 | James ............ H04M 3/5233 379/52 |
| 2005/0114784 A1* | 5/2005 | Spring ............ G06F 17/30056 715/762 |
| 2005/0186550 A1 | 8/2005 | Gillani |
| 2006/0068367 A1 | 3/2006 | Parke et al. |
| 2006/0188860 A1 | 8/2006 | Morrison |
| 2006/0218225 A1 | 9/2006 | Hee Voon et al. |
| 2007/0099161 A1 | 5/2007 | Krebs et al. |
| 2007/0202484 A1 | 8/2007 | Toombs et al. |
| 2007/0203589 A1 | 8/2007 | Flinn et al. |
| 2007/0218446 A1 | 9/2007 | Smith et al. |
| 2007/0277092 A1* | 11/2007 | Basson ............ G06F 17/30017 725/60 |
| 2007/0300174 A1 | 12/2007 | Macbeth et al. |
| 2008/0014569 A1 | 1/2008 | Holiday et al. |
| 2008/0038705 A1 | 2/2008 | Kerns et al. |
| 2008/0222295 A1 | 9/2008 | Robinson et al. |
| 2008/0254434 A1 | 10/2008 | Calvert |
| 2008/0254438 A1 | 10/2008 | Woolf et al. |
| 2009/0035733 A1 | 2/2009 | Meitar |
| 2009/0162828 A1* | 6/2009 | Strachan ............ G06F 17/30056 434/350 |
| 2009/0186329 A1 | 7/2009 | Connor |
| 2009/0313021 A1* | 12/2009 | Carminati ............ G10L 13/00 704/260 |
| 2010/0003660 A1* | 1/2010 | Schmitt ............ G09B 19/0053 434/350 |
| 2010/0035225 A1 | 2/2010 | Kerfoot |
| 2010/0041007 A1 | 2/2010 | Wang |
| 2011/0010328 A1 | 1/2011 | Patel et al. |
| 2011/0039249 A1 | 2/2011 | Packard et al. |
| 2011/0126253 A1 | 5/2011 | Roberts et al. |
| 2011/0177480 A1 | 7/2011 | Menon et al. |
| 2011/0177483 A1 | 7/2011 | Needham et al. |
| 2011/0265004 A1* | 10/2011 | Sitko ............ G06Q 10/10 715/730 |
| 2012/0148997 A1* | 6/2012 | Borowski ............ G06Q 10/063 434/322 |
| 2012/0164620 A1 | 6/2012 | Needham |
| 2012/0164621 A1 | 6/2012 | Katz |
| 2012/0185358 A1* | 7/2012 | Ajjarapu ................ G06Q 30/06 705/26.62 |
| 2013/0095461 A1 | 4/2013 | Menon et al. |
| 2013/0095465 A1 | 4/2013 | Menon et al. |
| 2013/0266922 A1 | 10/2013 | Needham et al. |
| 2013/0280690 A1 | 10/2013 | Menon et al. |
| 2016/0063878 A1 | 3/2016 | Subashchandrabose |

FOREIGN PATENT DOCUMENTS

| | | |
|---|---|---|
| KR | 20110090387 A | 8/2011 |
| WO | WO2009/016612 A2 | 2/2009 |
| WO | WO2011/088412 A1 | 7/2011 |

OTHER PUBLICATIONS

Claims in Mexican application No. MX/a/2012/008206, dated May 2014, 3 pages.
U.S. Appl. No. 13/007,147, filed Jan. 14, 2011, Office Action, Dec. 9, 2014.
U.S. Appl. No. 13/408,937, filed Feb. 29, 2012, Restriction Requirement, May 29, 2012.
U.S. Appl. No. 13/409,006, filed Feb. 29, 2012, Office Action, Jun. 6, 2012.
U.S. Appl. No. 13/408,914, filed Feb. 29, 2012, Office Action, Jun. 28, 2012.
U.S. Appl. No. 13/408,937, filed Feb. 29, 2012, Office Action, Sep. 5, 2012.
U.S. Appl. No. 13/007,166, filed Jan. 14, 2011, Office Action, Dec. 7, 2012.
U.S. Appl. No. 13/007,177, filed Jan. 14, 2011, Office Action, Dec. 7, 2012.
U.S. Appl. No. 13/409,006, filed Feb. 29, 2012, Final Office Action, Nov. 21, 2012.
U.S. Appl. No. 13/408,914, filed Feb. 29, 2012, Final Office Action, Jan. 17, 2013.
U.S. Appl. No. 13/007,147, filed Jan. 14, 2011, Final Office Action, Jan. 25, 2013.
U.S. Appl. No. 13/271,328, filed Oct. 12, 2011, Office Action, Jan. 29, 2013.
U.S. Appl. No. 13/408,937, filed Feb. 29, 2012, Final Office Action, Mar. 12, 2013.
U.S. Appl. No. 13/408,914, filed Feb. 29, 2012, Interview Summary, Apr. 1, 2013.
U.S. Appl. No. 13/007,177, filed Jan. 14, 2011, Final Office Action, Aug. 6, 2013.
U.S. Appl. No. 13/007,147, filed Jan. 14, 2011, Office Action, Sep. 10, 2012.
U.S. Appl. No. 13/007,147, filed Jan. 14, 2011, Interview Summary, Apr. 2, 2013.
U.S. Appl. No. 13/007,147, filed Jan. 14, 2011, Office Action, Jul. 25, 2013.
The State Intellectual Property Office of the Peoples's Republic of China, "Notification of the 2nd Office Action" in application No. 201180011412.X, dated Jan. 16, 2015, 10 pages.
Claim in Chinese Application No. 201180011412.X, dated Jan. 2015, 6 pages.
The Patent Office of the People's Republic of China, "Notification of 3rd Office Action" in application No. 201180011412.X, dated May 14, 2015, 5 pages.
Claims in China application No. 201180011412.X, dated May 2015, 9 pages.
U.S. Appl. No. 13/007,147, filed Jan. 14, 2011, Final Office Action, Jan. 29, 2014.
Korean Intellectual Property Office, "Office Action" in application No. PCT/US2012/059822 dated Mar. 19, 2013, 10 pages.
Current Claims in Korean application No. PCT/US2012/059822 dated Mar. 2013, 9 pages.

(56) References Cited

OTHER PUBLICATIONS

Brusilovsky, Peter, "Knowledge Tree: A Distributed Architecture for Adaptive E-Learning", dated May 17-22, 2004, 10 pages.
Brusilovsky, Peter, "From Learning Objects to Adaptive Content Services for E-Learning", dated 2008, 19 pages.
Canadian Intellectual Property Office, "Office Action", Canadian Application No. 2,787,133, dated Sep. 13, 2013, 2 pages.
Claims from Canadian Application No. 2,787,133, dated Sep. 13, 2013, 19 pages.
European Patent Office, "Summons to Attend Oral Proceedings" in application No. 11702737.5-1958, dated Oct. 29, 2014, 4 pages.
Claims in European Application No. 11702737.5-1958, dated Oct. 2014, 3 pages.
Claims in Canadian Application No. 2,787,133, dated Oct. 2014, 23 pages.
Canadian Intellectual Property Office, "Search Report" in application No. 2,787,133, dated Oct. 21, 2014, 4 pages.
The State Intellectual Property Office of the People's Republic of China, "Notification of the First Office Action" in application No. 201180011412.X, dated May 30, 2014, 25 pages.
Claims in Chinese Application No. 201180011412.X, dated May 2014, 4 pages.

\* cited by examiner

202
RECEIVE, FROM A CLIENT DEVICE, A REQUEST FOR A LEARNING RESOURCE; WHEREIN THE REQUEST INCLUDES: INFORMATION IDENTIFYING A PARTICULAR USER, AND CONTEXT INFORMATION FOR THE CLIENT DEVICE

204
SELECT A FORMAT OF THE LEARNING RESOURCE TO DELIVER TO THE CLIENT DEVICE BASED, AT LEAST IN PART, ON THE INFORMATION IDENTIFYING THE PARTICULAR USER AND THE CONTEXT INFORMATION FOR THE CLIENT DEVICE

206
AFTER SELECTING THE FORMAT OF THE LEARNING RESOURCE TO DELIVER TO THE CLIENT DEVICE, DETERMINE WHETHER THE LEARNING RESOURCE IS STORED AT A RESOURCE REPOSITORY IN THE SELECTED FORMAT

208
IN RESPONSE TO DETERMINING THAT THE LEARNING RESOURCE IS NOT STORED AT THE RESOURCE REPOSITORY IN THE SELECTED FORMAT, PERFORM THE STEPS OF: SELECTING AN INSTANCE OF THE LEARNING RESOURCE, WHICH IS IN A FORMAT OTHER THAN THE SELECTED FORMAT, FROM THE RESOURCE REPOSITORY, AND CONVERTING THE SELECTED INSTANCE OF THE LEARNING RESOURCE TO A CONVERTED INSTANCE OF THE LEARNING RESOURCE IN THE SELECTED FORMAT

210
MAKE THE LEARNING RESOURCE, IN THE SELECTED FORMAT, AVAILABLE TO THE CLIENT DEVICE BY MAKING THE CONVERTED INSTANCE OF THE LEARNING RESOURCE AVAILABLE TO THE CLIENT DEVICE

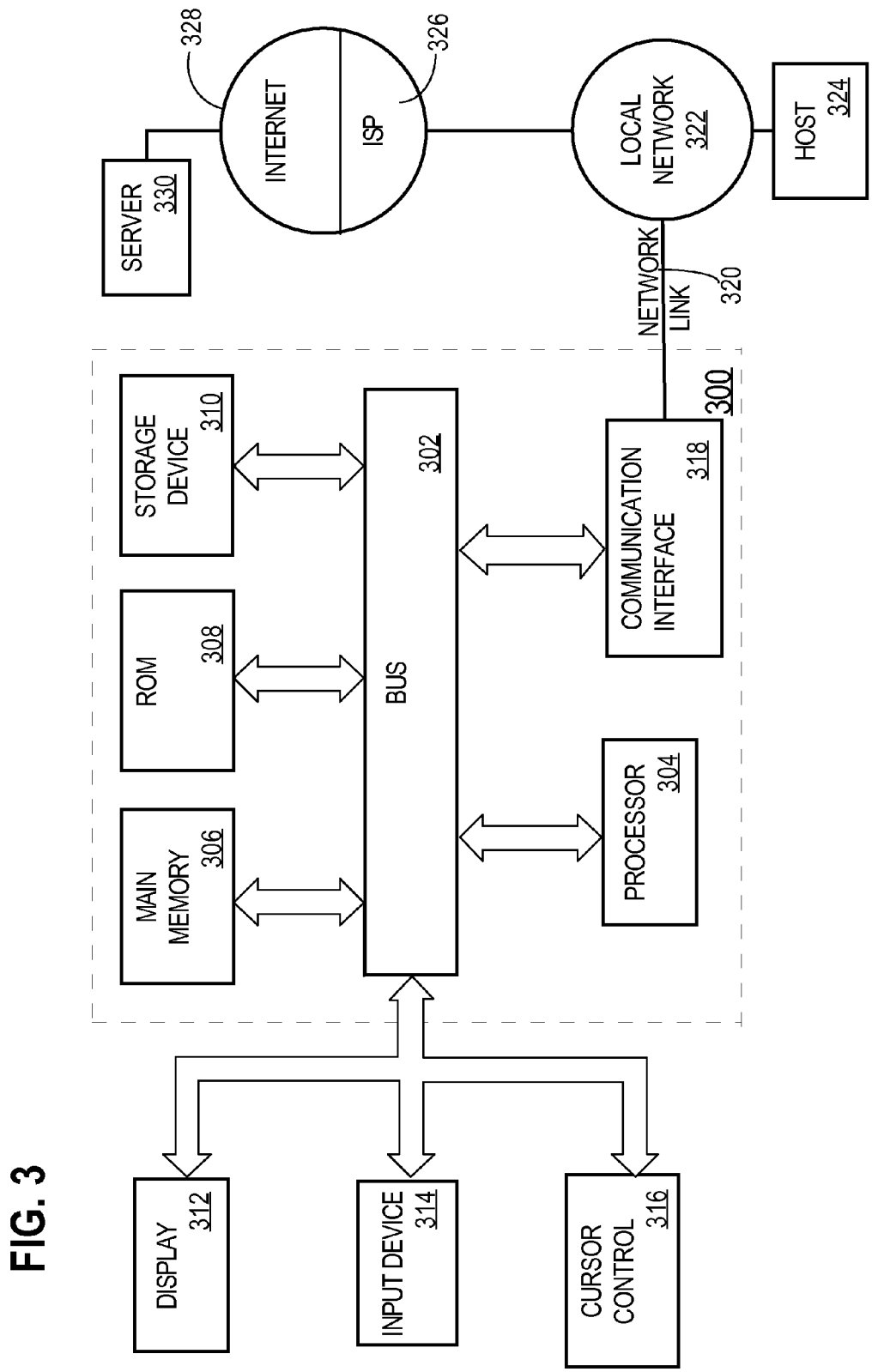

RESOURCE RESOLVER

CROSS-REFERENCE TO RELATED APPLICATIONS

This application is related to copending application Ser. No. 13/007,147, titled "Dynamically Recommending Learning Content", filed Jan. 14, 2011, the entire contents of which is hereby incorporated by reference as if fully set forth herein.

FIELD OF THE INVENTION

The present invention relates to selecting learning resources for user access, and, more specifically, to selecting and delivering a learning resource in a resource format that is the best fit for a user based, at least in part, on user information and information indicating the context of the user's client device.

BACKGROUND

Many people would benefit from additional education, but are not able to attend traditional institutions of learning. To serve people with such circumstances, learning institutions make education opportunities available online, via the Internet. Putting education opportunities online allows these opportunities to be accessed by a greater number of students than are able to attend classes at a traditional campus of an institution of learning.

Learning institutions spend valuable resources creating learning material to make available online. Such online learning material can stored in formats that take advantage of common capabilities of client computing systems, such as Portable Document Format (PDF) readers, video players, audio players, Adobe Flash players, Java interpreters, and other functionality with which a client device may be configured. However, if a client device is not configured with particular technology required to access a particular format of learning material, the user of the client device will not be able to access the learning material via the client device.

Furthermore, all formats of educational content may not be suitable for all users, e.g., given their disabilities or personal preference. For example, a user that is hearing-impaired may not benefit from educational content provided in audio format. Many times, a user with a disability is not able to benefit from educational courses that are created for the general population of users, and must instead take educational courses that are specially designed for users with that disability. Learning institutions may be required to spend extra time and effort to produce educational content that meets users' special needs or personal preference.

Thus, it would be beneficial to make educational content that is created for the general population of students more widely available, i.e., to cater to specific capabilities of client devices and to the needs of individual users.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

In the drawings:

FIG. 2 depicts a flowchart for processing a user's request for a learning resource and making the learning resource available to the user, according to embodiments of the invention.

FIG. 3 is a block diagram of a computer system on which embodiments may be implemented.

DETAILED DESCRIPTION

Figure 1:
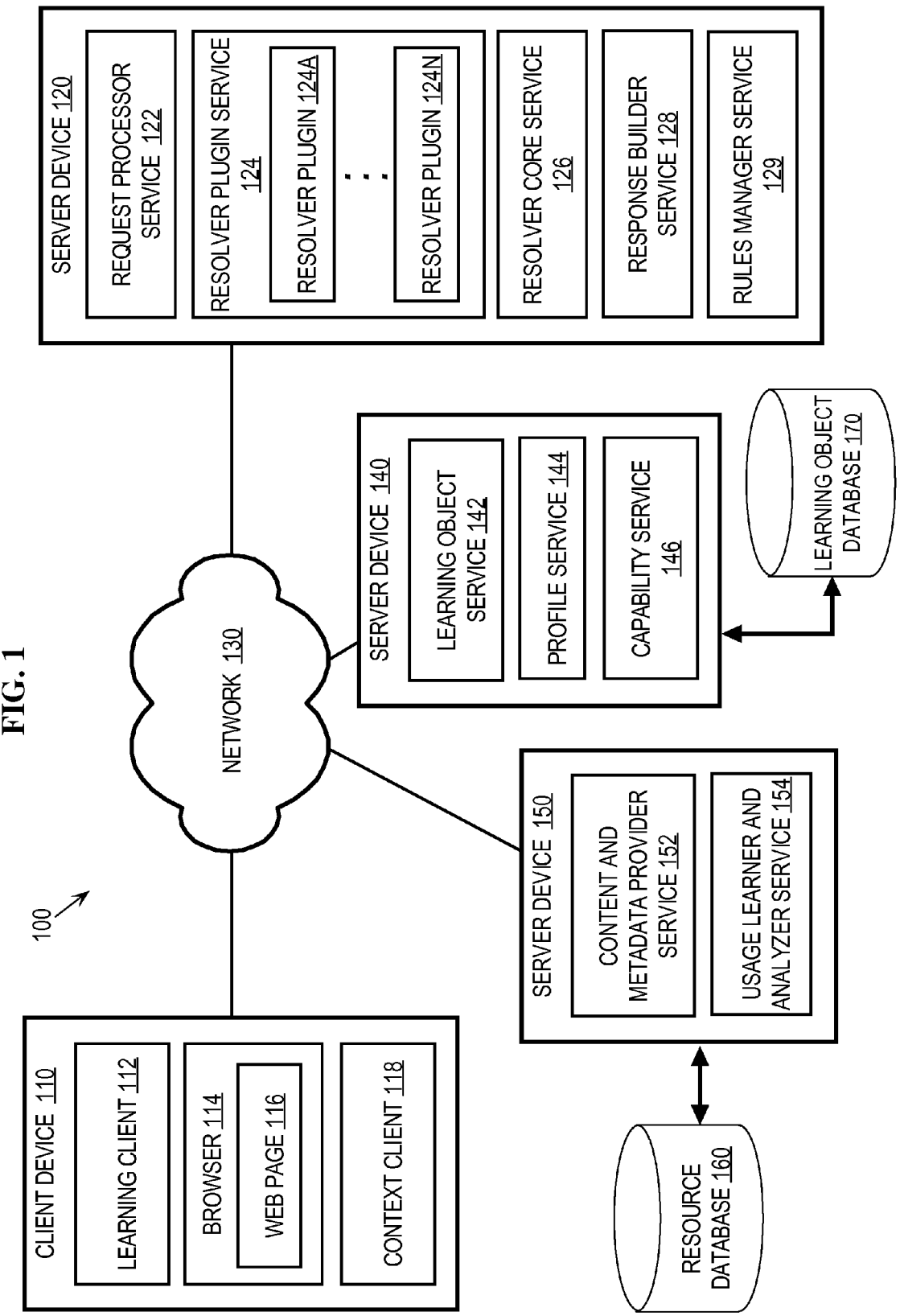
FIG. 1 is a block diagram that depicts an example network arrangement for a resource resolver system that receives a request for a learning resource from a client device, selects a resource format for the requested learning resource based on user information and context information for the client device, and makes the requested resource in the selected format available to the client device as a response to the request.

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

General Overview

An automated resource resolver system receives, from a client device, a request for learning resources, which communicate learning material. The system selects a learning resource format for a target learning resource, to be delivered to the client device, based on user information and information about the context of the client device. Thus, the selected resource format will be accessible by the client device, utilizing the capabilities of the device, and will be the best-fit format for the user given the user information.

For example, if the user information for a particular user indicates that the user has vision loss and the target resource is a video resource, then the system selects an audio format for the target learning resource. As a further example, if the user information for a particular user indicates that the user has both vision and hearing loss, then the system selects a braille display format for the target learning resource.

After the system selects the resource format, the system determines whether any instance of the target learning resource stored at a resource repository is in the selected resource format. If not, then the system selects an instance of the target learning resource that is not in the selected resource format to convert to the selected resource format. The system converts the selected resource instance to produce an instance of the target learning resource that is in the selected format. The system makes the target learning resource, in the selected format, available to the client device.

Resource Resolver Architecture

Techniques are described hereafter for providing learning resources, which communicate learning material, to a requesting client device in a format that is selected based on user information and context information for the requesting client device. FIG. 1 is a block diagram that depicts an example network arrangement 100 for a resource resolver system that receives a request for a learning resource from a client device, selects a resource format for the requested learning resource based on user information and context information for the client device, and makes the requested resource in the selected format available to the client device as a response to the request.

Network arrangement 100 includes a client device 110 and server devices 120, 140, and 150 communicatively coupled via a network 130. Server device 150 is also communicatively coupled to a resource database 160 and server device 140 is communicatively coupled to a learning object database 170. Example network arrangement 100 may include other devices, including client devices, server devices, databases, and display devices, according to embodiments. For example, one or more of the services attributed to any of server devices 120, 140, and 150 herein may run on other server devices that are communicatively coupled to network 130, including server devices depicted in FIG. 1 and server devices that are not depicted in FIG. 1.

Client device 110 may be implemented by any type of computing device that is communicatively connected to network 130. Example implementations of client device 110 include, without limitation, workstations, personal computers, laptop computers, personal digital assistants (PDAs), tablet computers, cellular telephony devices such as smart phones, and any other type of computing device.

In network arrangement 100, client device 110 is configured with a learning client 112, a browser 114 that displays a web page 116, and a context client 118. Learning client 112, and also context client 118, may be implemented in any number of ways, including as a plug-in to browser 114, as an application running in connection with web page 116, as a stand-alone application running on client device 110, etc. Learning client 112 and context client 118 may be implemented by one or more logical modules.

Learning client 112 is configured to communicate requests for learning resources to request processor service 122, which is described in further detail below. Context client 118 is configured to identify one or more aspects of the context of client device 110 and make that information available to learning client 112 and/or request processor service 122. Browser 114 is configured to interpret and display web pages that are received over network 130 (e.g., web page 116), such as Hyper Text Markup Language (HTML) pages, eXtensible Markup Language (XML) pages, etc. According to an embodiment, learning client 112 and/or context client 118 are configured to be used on a mobile device (such as personal digital assistants (PDAs), tablet computers, cellular telephony devices, etc.). For example, context client 118 is configured to detect that client device 110 is a mobile device and learning client 112 is configured to cause web pages being sent to browser 114 to be configured for a mobile device display in response to receiving information from context client 118 that client device 110 is a mobile device. Client device 110 may be configured with other mechanisms, processes and functionalities, depending upon a particular implementation.

Further, client device 110 is communicatively coupled to a display device (not shown in FIG. 1), for displaying graphical user interfaces, such as a graphical user interface of web page 116. Such a display device may be implemented by any type of device capable of displaying a graphical user interface. Example implementations of a display device include a monitor, a screen, a touch screen, a projector, a light display, a display of a tablet computer, a display of a telephony device, a television, a braille display device, etc.

Network 130 may be implemented with any type of medium and/or mechanism that facilitates the exchange of information between client device 110, and server devices 120, 140, and 150. Furthermore, network 130 may facilitate use of any type of communications protocol, and may be secured or unsecured, depending upon the requirements of a particular embodiment.

Server devices 120, 140, and 150 may be implemented by any type of computing device that is capable of communicating with other devices over network 130. In network arrangement 100, server device 120 is configured with a request processor service 122, a resolver plugin service 124, a resolver core service 126, a response builder service 128, and a rules manager service 129. In network arrangement 100, server device 140 is configured with a learning object service 142, a profile service 144, and a capability service 146. In network arrangement 100, server device 150 is configured with a content and metadata provider service 152, and a usage learner and analyzer service 154. Server devices 120, 140, and 150 may be configured with other mechanisms, processes and functionalities, depending upon a particular implementation.

Server device 150 is communicatively coupled to resource database 160 and server device 140 is communicatively coupled to learning object database 170. Resource database 160 and/or learning object database 170 may reside in any type of storage, including volatile and non-volatile storage (e.g., random access memory (RAM), one or more hard or floppy disks, main memory, etc.), and may be implemented by one or more logical databases. The storage on which resource database 160 resides may be external or internal to server device 150 and the storage on which learning object database 170 resides may be external or internal to server device 140. Furthermore, while resource database 160 and learning object database 170 are depicted as distinct, the databases may reside on the same device and may be managed by the same database management system.

One or more of services 122-129, 142-146, 152, and 154 may be part of a cloud computing service. Functionality attributed to one or more of these services may be performed by other services or clients depicted in network arrangement 100, according to embodiments. Services 122-129, 142-146, 152, and 154 may variously be implemented by one or more logical modules, and are described in further detail below. Any of learning client 112, context client 118, and services 122-129, 142-146, 152, and 154 may receive and respond to Application Programming Interface (API) calls, Simple Object Access Protocol (SOAP) messages, requests via HyperText Transfer Protocol (HTTP), HyperText Transfer Protocol Secure (HTTPS), Simple Mail Transfer Protocol (SMTP), or any other kind of communication, e.g., from one of the other services or from learning client 112 or context client 118. Further, any of learning client 112, context client 118, and services 122-129, 142-146, 152, and 154 may send one or more of the following over network 130 to one of the other clients or services of the system: information via HTTP, HTTPS, SMTP, etc.; XML data; SOAP messages; API calls; and other communications according to embodiments.

In an embodiment, each of the processes described in connection with one or more of learning client 112, context client 118, and services 122-129, 142-146, 152, and 154 are performed automatically and may be implemented using one or more computer programs, other software elements, and/or digital logic in any of a general-purpose computer or a special-purpose computer, while performing data retrieval, transformation, and storage operations that involve interacting with and transforming the physical state of memory of the computer.

Requesting the Learning Resource

Via an online education program, a user may request learning resources in connection with a course of study, e.g., as part of obtaining a degree from an institute of learning, or as part of obtaining a skills certificate, etc. A user may also request learning resources from an online education program that are unrelated to a course of study, e.g., to learn a foreign spoken language, a programming language, how to grow a garden, etc. Online education is accomplished by making digital learning resources available to users via the Internet.

A user may access a digital learning resource via a client device that is configured to allow access to the particular format of the digital learning resource. A particular resource format indicates the technology used to encode the one or more resource files. A user may access learning resources in a particular format via a client device, such as client device 110, when the client device has access to resources in the particular format, i.e., the client device has applications running thereon that are configured to properly interpret resource information in the particular format. For example, client device 110 is configured with a PDF reader application, such as Adobe PDF Reader, which allows client device 110 access to PDF files; as such, a user of client device 110 may access the PDF files.

FIG. 2 depicts a flowchart 200 for processing a user's request for a learning resource and making the learning resource available to the user, according to embodiments of the invention. At step 202, a request for a learning resource is received from a client device, wherein the request includes information identifying a particular user, and context information for the client device. For example, a user of client device 110 indicates to learning client 112, i.e., via web page 116, that the user wants to consume a learning resource, and, in response, learning client 112 formulates a request to send to request processor service 122. This request is referred to herein as the client request. Learning client 112 includes, in the client request, (a) information identifying the user of client device 110 obtained from the user login; and (b) context information for client device 110 obtained from context client 118. Learning client 112 also includes, in the client request, any more specific requirements for the learning resource, e.g., a resource format or format category that the user explicitly prefers for the learning resource, etc.

Gathering User and Client Context Information

Learning client 112 obtains the user information needed for the client request from the user login. For example, upon the user initiating a session with learning client 112, learning client 112 authenticates the user by requesting user-specific login information. The user-specific login information provided by the user uniquely identifies the user to learning client 112. From this login information, learning client 112 determines the user's unique identifier, which also uniquely identifies the user's profile information in the resource resolver system. Learning client 112 includes the unique identifier of the user in the client request.

Learning client 112 obtains the context information for client device 110, needed for the client request, from context client 118. Context client 118 gathers this context information from client device 110 and makes the information available to learning client 112. Client context information includes one or more of: a type of client device 110 (a tablet, a desktop computer, a mobile phone, etc.); an operating system running on client device 110; a type of network connection (e.g., 3G, 4G, WiFi, etc.); information about the run-time capabilities of the device; a user agent for learning client 112 (e.g., stand-alone application, browser 114, etc.); a type of browser 114; plugins available at browser 114; specific resource formats that client device 110 is configured to access; Digital Rights Management (DRM) support; capability to decrypt particular protected resource formats based on licensing agreements; etc.

According to embodiments, client device 110 is configured with a DRM client that retrieves decryption keys, from a server accessible via network 130. Such retrieved decryption keys are configured to decrypt encrypted content when the consuming user and/or client device 110 is authorized to access the encrypted content. Decryption keys automatically expire based, at least in part, on one or more of: a time that a particular decryption key is retrieved; authority of the consuming user and/or client device 110 to access the encrypted content, etc. For example, when the authority of the consuming user and/or client device 110 to access particular encrypted content is revoked by an authority-granting entity, an associated decryption key does not allow a access to the particular encrypted content.

Information about the run-time capabilities of client device 110 includes applications, running or available at client device 110, that allow client device 110 to access resources that are in particular resource formats. According to an embodiment, context client 118 maintains a list of client applications that allow access to resources in particular resource formats. For example, such a list includes one or more of the following:

Adobe PDF Reader allows access to PDF files;
iTunes allows access to MP3 files, AIFF files, etc.;
Windows Media Player allows access to WMV files, WAV files, etc.;
Adobe Flash Player allows access to Flash simulation files, FLV files, etc.

According to an embodiment, when gathering information about the run-time capabilities of client device 110, context client 118 identifies and records, in the client context information, any applications, from the list of client applications, that are running or available on client device 110 during the client session. According to another embodiment, context client 118 identifies and records, in the client context information, particular resource formats associated with applications, from the list of client applications, that are running or available on client device 110 during the client session.

A user initiates a client session with learning client 112 by logging into learning client 112 and terminates the client session, e.g., by logging out of learning client 112, turning off client device 110, etc. According to an embodiment, when a user initiates a client session with learning client 112, context client 118 gathers information about the context of client device 110 and stores the context information. In this embodiment, context client 118 keeps the client context information current by updating the stored context information upon detecting a change event in client device 110. Examples of change events include installation or removal of a run-time application, a change in the network connection for client device 110, etc. According to another embodiment, context client 118 gathers context information for client device 110 upon receiving information that learning client 112 is formulating a client request. In this embodiment, context client 118 gathers fresh context information for each client request.

Context client 118 makes the gathered context information available to learning client 112 for at least partial inclusion in the client request. For example, context client 118 makes the client context information available by returning the client context information, or a location of the client context information, to learning client 112. As another example, context client 118 makes the client context information available at a location known to learning client 112 and learning client 112 retrieves the information directly from the known location. In this example, context client 118 also makes information indicating whether the client context information is up-to-date to learning client 112. Context client 118 stores the context information for client device 110 in an information cache on client device 110.

Identifying a Learning Resource for the Client Request

Learning client 112 sends the generated client request to request processor service 122. According to an embodiment, in response to receiving the client request, request processor service 122 sends a request for learning object information to learning object service 142. Learning object service 142 identifies a learning object and associated learning resource, for the client request, from learning object database 170.

According to embodiments, learning resources are organized via learning objects in learning object database 170. A learning object is a container for one or more learning resources, which are configured to communicate learning material to teach a particular skill or learning goal associated with the learning object. Each learning object in learning object database 170 is associated with at least one resource that communicates learning material for the learning object. A learning object also includes metadata for the one or more associated learning resources, which metadata includes one or more of: a location of a resource; a unique identifier of a resource; a format category of a resource; whether a resource is a "main" resource for the learning object; a name of a resource; etc.

Learning object database 170 stores information about how learning objects relate to courses of study, to other learning objects, etc. By associating learning resources with learning objects, administrators may adjust the learning resources that are associated with particular learning objects—e.g., to replace a learning resource with an updated version of the learning resource—without requiring adjustment to relationships between learning objects. Also, administrators may disseminate information identifying learning objects, e.g., via learning client 112, which information does not need to be updated when learning resources associated with the learning objects are replaced or updated.

According to a particular embodiment, the client request is a request for a learning resource associated with a particular learning object. For example, a user selects an identifier of a particular learning object displayed via web page 116. In response to detecting this selection, learning client 112 sends a client request for the identified learning object, which client request includes the identifier of the learning object, to request processor service 122. Learning object service 142 identifies the requested learning object in learning object database 170 based on the learning object identifier from the client request.

According to another embodiment, the client request is a request for a learning resource associated with a learning object that furthers the user's current course of study, where information for the learning object not included in the client request. For example, learning client 112 includes, in a client request, a request for a learning object that furthers the user's current course of study. In this embodiment, in response to receiving information indicating the client request for a learning object that furthers the user's current course of study, learning object service 142 identifies a learning object for the client request based, at least in part, on one or more of: goals of the user indicated in the user's profile (e.g., the user's course of study, a skill that the user has expressed interest in mastering, etc.); the user's demonstrated comprehension skills; learning objects that the user has completed; information about relationships between learning objects in learning object database 170; etc.

After identifying a particular learning object, learning object service 142 identifies a particular learning resource, associated with the identified learning object, to make available to client device 110. According to an embodiment, if there are multiple learning resources associated with a particular learning object and the user has not yet accessed any of the resources for the learning object, learning object service 142 identifies the "main" resource for the particular learning object as the resource to be made available to client device 110. The identified learning resource to be made available to client device 110 is referred to herein as the target resource.

Target Format Category

Learning object service 142 returns, to request processor service 122, information for target learning resource. This information includes at least metadata indicating a format category for the target learning resource, which is referred to herein as the target format category. A format category indicates a type of the resource, and encompasses multiple resource formats. As such, identifying a format category for a learning resource does not identify a particular resource format in which the resource is stored, i.e., at resource database 160, which is a repository for resource information. Rather, identifying a format category for a learning resource identifies two or more resource formats in which the resource may be stored. Examples of format categories and encompassed resource formats include:

VIDEO, which encompasses resource formats such as MP4, AVI, FLV, WMV, etc.;
AUDIO, which encompasses resource formats such as MP3, WAV, WMA, M4A, etc.;
SIMULATION, which encompasses resource formats such as Flash objects, JAVA applets, etc.; and
BOOKS, which encompasses resource formats such as eBooks, PDF, Word DOC, etc.

A subcategory of a format category is associated with a subset of resource formats in the format category. According to an embodiment, a subcategory is not associated with resource formats from format categories other than the category for the subcategory. According to an embodiment, a format category includes one or more resource formats that are not associated with a particular subcategory of the format category.

The resource formats associated with a format subcategory conform to one or more special requirements for the subcategory. For example, subcategories of VIDEO include: LOW BIT-RATE VIDEO (i.e., VIDEO resource formats that deliver a bit-rate less than 128 kbits/second); HD VIDEO (i.e., VIDEO resource formats that deliver a bit-rate of at least 8 Mbits/second); VIDEO WITH CAPTIONS (i.e., VIDEO resource formats that include subtitle capabilities); etc. Herein, reference to a format category is a shortened reference to a format category or subcategory unless explicitly indicated otherwise, for ease of explanation.

According to an embodiment, learning object service 142 does not send information indicating a specific resource format for the target learning resource to request processor service 122. Because resolver core service 126 identifies a best-fit resource format for the client request, regardless of the specific one or more resource formats in which the target resource is found in resource database 160, information about a specific resource format in which the resource is stored is immaterial to the determination made by resolver core service 126 as described in further detail below.

According to another embodiment, learning object service 142 includes information about a specific resource format for the target learning resource in the communication to request processor service 122. In this embodiment, if the metadata for the target resource does not include a format category, then resolver core service 126 uses the specific resource format for the target resource to determine the format category for the resource. Resolver core service 126 uses the format category in the determination of a best-fit resource format for the client request. Nevertheless, resolver core service 126 identifies a best-fit resource format for the client request regardless of the specific resource format for the target resource.

Identifying a Best-Fit Resource Format

At step 204, a format of the learning resource to deliver to the client device is selected based, at least in part, on the information identifying the particular user and the context information for the client device. For example, request processor service 122 sends, to resolver core service 126, the format category for the target resource and at least part of the user and client context information from the client request. Resolver core service 126 selects which resource format is the best fit for the client request based on the received information.

Gathering Profile Information and Client Capability Information

Resolver core service 126 requests the user's profile information from profile service 144 based, at least in part, on the unique user identifier from the client request. According to embodiments, a user's profile includes one or more of: a user's preferences identified by explicit indications by the user (e.g., the user prefers HD VIDEO, the user prefers AUDIO over TEXT, etc.); historical user tendencies (e.g., the user tends to fail to complete videos while the user is connected to the internet via a 3G connection, etc.); a preferred natural or spoken language for the user; and disability information for the user (e.g., explicit indications by the user of a disability given in context of previously delivered learning resources, information gathered or inferred about the user that indicates a disability, etc.).

Resolver core service 126 also requests, from capability service 146, information about the resource formats that client device 110 can access given the device context information in the client request. Capability service 146 compiles a list of resource formats that client device 110 can access based on (a) context information that indicates that client device 110 can access particular resource formats, and (b) information accessible by the service indicating specific resource formats that a device can access given particular device context information (e.g., device type, operating system, etc.).

To illustrate, capability service 146 receives context information for client device 110 that includes a type of a network connection, a type of the device, and an operating system running on the device. Capability service 146 identifies a working list of resource formats that a device of the indicated type with the indicated operating system can access, i.e., with a default run-time configuration. According to an embodiment, capability service 146 maintains a list of applications that are run for the default run-time configuration of a given type and operating system of a given device. Capability service 146 also maintains information indicating resource formats that particular applications are configured to access. Capability service 146 uses such information to determine the working list of resource formats that client device 110 can access in a default run-time configuration.

For example, the context information for client device 110 indicates that the device is a smart phone with the Apple iOS7 operating system installed thereon, i.e., an iPhone iOS7. Capability service 146 has information indicating that the default run-time configuration of an iPhone iOS7 does not include an application that accesses resources in the Flash object resource format. As such, capability service 146 does not include Flash object in the working list of resource formats that client device 110 can access.

According to a further embodiment, capability service 146 maintains information indicating resource formats that a device of a given type and operating system can access in the default run-time configuration. Capability service 146 creates the working list of resource formats that client device 110 can access from the indicated resource formats for the configuration of client device 110.

According to embodiments, capability service 146 refines the working list of resource formats that client device 110 can access based on further context information for client device 110. For example, capability service 146 refines the working list of resource formats that client device 110 can access given a particular type of a network connection for client device 110. Capability service 146 maintains information that associates the type of a network connection with an average throughput for the network connection. Capability service 146 also maintains information indicating throughput needed to access particular resource formats. Based on this information, capability service 146 eliminates, from the working list of resource formats generated for client device 110, those resource formats that require more throughput than the network connection allows. As a further example, if the network connection for client device 110 handles only relatively low throughput, then capability service 146 determines that client device 110 cannot access resource formats associated with the subcategory HD VIDEO, which resource formats require more throughput than the network connection for client device 110 allows. Consequently, capability service 146 removes resource formats associated with HD VIDEO from the working list of resource formats for client device 110.

Capability service 146 also refines the working list of resource formats that client device 110 is configured to access based on device context information that indicates particular applications running on client device 110, and/or one or more changes in the operating system kernel. For example, if device context information of the previous example also includes a list of one or more applications, capability service 146 determines that resource formats accessible using the listed one or more applications should be added to the working list of resource formats for client device 110.

For example, the context information for client device 110 indicates that the device is a smart phone with the Apple iOS7 operating system installed thereon, i.e., an iPhone iOS7. The context information further indicates that the run-time configuration of client device 110 includes a particular application that is not in the default configuration of an iPhone iOS7, e.g., the Photon Browser. Capability service 146 has information that the Photon Browser accesses resource of the Flash object resource format. In this example, capability service 146 includes Flash object in the working list of resource formats that client device 110 can access.

Capability service 146 further refines the working list of resource formats that client device 110 is configured to access based on device context information that indicates that an application that is normally included in the default run-time configuration of client device 110 is disabled or missing in client device 110. For example, context information for client device 110 indicating that a particular application is disabled, which would normally be enabled in a default run-time configuration of the device, causes capability service 146 to remove, from the working list of resource formats for client device 110, those resource formats that the disabled application accesses, unless another application running on the device can access those resource formats.

Once capability service 146 has processed all of the client context information, capability service 146 sends the final version of the working list of resource formats that client device 110 is configured to access to resolver core service 126.

Identifying a Best-Fit Resource Format

Resolver core service 126 selects a resource format, for the target resource, that is the best fit for the user based on one or more of: the target format category, the information gathered from profile service 144, and the information gathered from capability service 146. If user profile information indicates an explicit user preference that is applicable for the target resource, resolver core service 126 uses the preference information to select the best-fit format for the target resource. Otherwise, resolver core service 126 uses the format category information for the target resource and any disability information for the user to determine candidate format categories for delivering the target resource. Resolver core service 126 uses the client context information and further information from the user's profile to narrow down multiple candidate format categories to a selected format category for delivering the target resource. Resolver core service 126 then identifies one or more best-fit resource formats for the target resource that are accessible by client device 110 based on the client capabilities information.

Identifying a Best-Fit Resource Format Based on Explicit User Preferences

According to embodiments, resolver core service 126 first determines whether explicit user preference data in the user's profile or client request identifies a particular resource format that the user prefers when receiving a resource of the target resource category. An explicit user preference is an indication, by the user, of a user preference that is stored at the user profile. If such user preference information indicates a resource format that client device 110 can access (according to the client capabilities information), then resolver core service 126 selects the preferred resource format as the resource format for delivery of the target resource.

For example, the target format category is VIDEO and explicit user preference information in the user's profile indicates that the user prefers the resource format MP4 when receiving a VIDEO resource. The resource format MP4 is in the list of resources that client device 110 can access. In this example, resolver core service 126 selects MP4 as the resource format for delivering the target resource to client device 110.

As a further example, explicit user preference information indicates that a user prefers that the resource resolver system perform no conversion on the target resource, which preference is not subject to a current override. Resolver core service 126 retrieves, from content and metadata provider service 152, a list of resource formats in which the target resource is stored at resource database 160. Resolver core service 126 determines whether client device 110 can access any of resource formats in which the target resource is stored. If there is only a single resource format from the list that client device 110 can access, then resolver core service 126 identifies the accessible resource format as the selected resource format for the target resource. If there are multiple resource formats that client device 110 can access from the list, resolver core service 126 identifies the best-fit resource format based on device capabilities (as described below) and selects the best-fit resource format for the target resource.

If resolver core service 126 determines that client device 110 cannot access any of the resource formats in which the target resource is stored at resource database 160, then resolver core service 126 causes response builder service 128 to formulate a response that indicates that the target resource is undeliverable unless the user grants permission convert the target resource to a resource format accessible by client device 110. If the user gives permission for conversion, then learning client 112 causes profile service 144 to record a temporary or permanent override to the explicit preference for no converted resources and sends another client request to request processor service 122.

According to a particular embodiment, indication of a specific preferred resource format for the target format category causes resolver core service 126 to skip determination of candidate categories described below and to forward the selected resource format to resolver plugin service 124.

According to another embodiment, resolver core service 126 selects a specific resource format based on the explicit user preference information, as described above, and also identifies a second specific resource format using rules that are specific to the target format category, as described below. In this embodiment, learning client 112 receives information for both selected resource formats and presents the user with information requesting selection of a particular resource format in which to access the target learning resource. As such, the resource resolver system provides the user with the ability to choose something different than the user chose before, while giving the user easy access to the user's previously-preferred resource format.

According to yet another embodiment, resolver core service 126 determines whether explicit user preference data in the user's profile identifies one or more particular format categories that the user prefers when receiving a resource of the target resource category. For example, the target format category is VIDEO and explicit user preference information in the user's profile indicates that the user prefers: HD VIDEO; VIDEO WITH CAPTIONS; AUDIO; and/or TEXT.

If the user preference information indicates multiple format categories that the user prefers for receiving the target format category, then resolver core service 126 identifies those preferred format categories that have associated resource formats that client device 110 can access to be candidate format categories, which are processed as described in further detail below. If the user preference information indicates a single preferred format category, and client device 110 can access at least one resource format associated with the preferred format category, then resolver core service 126 identifies the preferred format category to be the selected format category, which is processed as described in further detail below. If client device 110 cannot access any resource format associated with any of the preferred format categories, then resolver core service 126 identifies further candidate categories using rules associated with the target format category as described below.

Identifying Candidate Format Categories Based on Rules for the Target Format Category In order to identify a resource format that best fits the user information and client capabilities information for client device 110, resolver core service 126 identifies a set of one or more candidate format categories for the target resource using a set of rules that are specific to the target format category. Resolver core service 126 has access to a repository of sets of rules for each format category associated with resources in resource database 160. The rules in a particular set of rules identify one or more candidate format categories, for delivering a resource of the associated format category, that would best fit particular user disability information. For example, a set of rules that are specific to the VIDEO format category are as follows:

- If the user is vision-impaired, then the candidate categories are: MAGNIFIABLE TEXT, BRAILLE DISPLAY, and AUDIO.
- If the user is hearing-impaired, then the candidate categories are: TEXT, and VIDEO WITH CAPTIONS.
- [Default Rule] Else, the candidate category is VIDEO.

Resolver core service 126 identifies a particular rule, from a set of rules specific to the target format category, that most closely fits the user's disability information. For example, resolver core service 126 has information indicating that the user has a single one of the disabilities indicated in the set of rules specific to the target format category. In this example, resolver core service 126 applies the rule that indicates the single disability.

As a further example, resolver core service 126 has information indicating that the user has multiple of the disabilities indicated in rules specific to the target format category. In this example, resolver core service 126 finds any overlap in the candidate categories indicated by the multiple rules. For example, using the rules for VIDEO indicated above, if a user is both vision- and hearing-impaired, then resolver core service 126 identifies that the subcategory MAGNIFIABLE TEXT is common to both the rule for vision-impairment and the rule for hearing-impairment, since the hearing-impairment rule includes TEXT, and the vision-impairment rule includes MAGNIFIABLE TEXT, which is a subcategory of TEXT. Resolver core service 126 identifies this common subcategory is the candidate category.

If there is no overlap in the candidate categories indicated by the multiple applicable rules, then resolver core service 126 determines whether the metadata for each of the candidate categories identified by the multiple rules indicates that the category is helpful for all of the disabilities of the user, or if the category is contraindicated for a user with one of the disabilities of the user. According to an embodiment, resolver core service 126 creates a single set of candidate categories from those categories indicated by the multiple rules that are helpful for a user with all of the disabilities of the user and/or are not contraindicated for all of the disabilities of the user. Resolver core service 126 processes the set of candidate categories as indicated below. According to another embodiment, resolver core service 126 identifies multiple sets of candidate categories, one from each of the rules that are applicable to the user (other than the default rule), removing, from the sets, any candidate category that in contraindicated for any of the disabilities of the user. Resolver core service 126 processes each set of candidate categories as indicated below.

Resolver core service 126 eliminates, from the set of candidate categories, any format category that client device 110 cannot access (i.e., that is not associated with a resource format that client device 110 can access). For example, based on the rules for a video resource and given information that the user is hearing-impaired, resolver core service 126 identifies the candidate categories for delivering the target resource to be MAGNIFIABLE TEXT, BRAILLE DISPLAY, and AUDIO. Resolver core service 126 determines that client device 110 cannot access resource of the BRAILLE DISPLAY category. In response to such determination, resolver core service 126 removes BRAILLE DISPLAY from the set of candidate categories.

According to an embodiment, rules manager service 129 manages the repository of sets of rules for each format category associated with resources in resource database 160. For example, rules manager service 129 retrieves usage information from usage learner and analyzer service 154, which information includes trends of resource categories that are delivered to and/or consumed by users with particular user attributes (e.g., vision-impaired, etc.). Rules manager service 129 adjusts rules in the repository based on the retrieved information, e.g., using machine learning.

To illustrate, rules manager service 129 receives information indicating that in at least a threshold percentage of instances where a target category is VIDEO and a user is vision-impaired, the user explicitly prefers to receive an instance of the VIDEO resource that includes both visual and audio components, i.e., to receive an instance of a VIDEO resource in a VIDEO format. In response to receiving this information, rules manager service 129 automatically adjusts a set of rules for the format category VIDEO to include VIDEO in the set of candidate categories for when the user is vision-impaired.

Identifying a Particular Candidate Format Category Based on Explicit User Preference Resolver core service 126 processes each set of candidate format categories by selecting a particular candidate format category for each set of candidate format categories. If multiple candidate format categories, in a particular set of candidate categories, are identified for delivering the target resource, resolver core service 126 utilizes further user information to identify a particular resource format category for the user, if further user information is available. According to an embodiment, resolver core service 126 utilizes explicit user preference information to aid in selecting a particular candidate category of a set of candidate categories. For example, resolver core service 126 identifies the set of MAGNIFIABLE TEXT, and AUDIO as the candidate resource format categories. Resolver core service 126 determines that the user's profile includes an explicit indication that the user prefers to have AUDIO delivered when the target format category is VIDEO. Since AUDIO is one of the candidate resource format categories, resolver core service 126 identifies AUDIO to be the selected format category for delivering the target resource to client device 110 based on the user preference information. In this embodiment, resolver core service 126 does not use the explicit user preference information if the user preference information indicates a preference for a category or specific resource format that is not included in the set of candidate format categories.

Identifying a Particular Candidate Format Category Based on Historical User Tendencies According to an embodiment, resolver core service 126 utilizes information indicating historical user tendencies, stored in the user profile, to identify a particular format category from a set of candidate format categories. Historical user tendencies are trends in how a user has historically behaved when interacting with the resource resolver system.

According to an embodiment, a historical user tendency is recorded when a particular behavior is noted more than a threshold percentage of the time when the behavior is a possibility. Resolver core service 126 utilizes historical user tendency information to select a candidate format category for the target resource. For example, resolver core service 126 identifies the candidate categories for delivering the target resource to be MAGNIFIABLE TEXT, BRAILLE DISPLAY, and AUDIO. Further, resolver core service 126 determines that the user's profile information indicates that the user prefers TEXT resources (or resources that are in a resource format associated with the TEXT format category) over any other kind of resource for a threshold percentage of instances in which the user is presented a choice that includes TEXT resources. In this example, resolver core service 126 selects MAGNIFIABLE TEXT as the format category for delivering the target resource to client device 110 based on the historical user tendency to select TEXT resources.

According to an embodiment, trends in historical user behavior will not cause resolver core service 126 to select a format category that is not a member of the set of identified candidate categories. For example, the user's profile information indicates that the user generally prefers SIMULATION resources, and the candidate categories are TEXT and VIDEO WITH CAPTIONS. Since SIMULATION is not one of the candidate categories, resolver core service 126 does not use this trend information to choose a candidate format category for delivering the target resource.

As yet another example, the user's profile information indicates that the user prefers AUDIO resources when the user is on a mobile phone-type client device and TEXT resources when the user is on a desktop-type client device. Resolver core service 126 identifies the candidate categories to be MAGNIFIABLE TEXT, BRAILLE DISPLAY, and AUDIO. In this example, both TEXT and AUDIO format categories are in the set of candidate categories. As such, resolver core service 126 determines what type of client device is indicated in the client context information. If the client context information indicates that the user is on a mobile phone-type device, then resolver core service 126 selects AUDIO to be the format category for delivering the target learning resource to client device 110. Further, if the user is on a desktop-type device, then resolver core service 126 selects MAGNIFIABLE TEXT to be the format category for delivering the target learning resource.

Resolver core service 126 may also use information indicating historical user tendencies to narrow a format category, which has been selected by resolver core service 126 for delivery of the target resource, to a subcategory of the format category. For example, resolver core service 126 identifies VIDEO to be the format category for delivering the target resource to client device 110. Information in the user's profile indicates that the user tends to consume resources of the subcategory HD VIDEO over other subcategories of VIDEO. Resolver core service 126 determines whether client device 110 can access at least one resource format associated with HD VIDEO, i.e., from the information from capability service 146. If client device 110 can access at least one resource format associated with HD VIDEO, then resolver core service 126 selects HD VIDEO as the subcategory for delivering the target resource to client device 110.

According to embodiments, resolver core service 126 includes resource format selection rules that can override other information, including information from the user's profile (e.g., explicit user preferences, historical user behavior, etc.) when selecting a format category, subcategory, or particular resource format for delivering a resource to a client device. For example, resolver core service 126 identifies VIDEO to be the format category for delivering the target resource to client device 110. Information in the user's profile indicates that the user tends to consume resources of the subcategory LOW BIT-RATE VIDEO over other subcategories of VIDEO. Resolver core service 126 identifies a resource format selection rule that states that the highest bit-rate of VIDEO should be delivered to the user, regardless of the user's historical user behavior. Based on this rule, resolver core service 126 identifies the highest bit-rate of VIDEO that client device 110 can access, i.e., from the information from capability service 146. Resolver core service 126 selects a subcategory of VIDEO or particular resource format associated with VIDEO that has the highest bit-rate that client device 110 can access and selects that subcategory or resource format for delivering the target resource to client device 110.

Identifying a Particular Candidate Format Category Based on Format Category Rankings Furthermore, resolver core service 126 may identify a particular format category, from the candidate format categories, based on ranking information for the candidate format categories. For example, an administrator may indicate, within metadata for the format categories, an order in which format categories are preferred for a user with particular disability information. To illustrate, an administrator includes, in metadata for format categories, that AUDIO is ranked 1 for vision-impaired users, BRAILLE DISPLAY is ranked 2, and TEXT is ranked 3. Additional ranking information may be included in format category metadata for other disabilities, such as hearing-impairment, ADHD, dyslexia, etc. Such ranking may be based on information about how users with the disability learn best. Such rankings may also be based on user feedback and automatically adjusted by the resource resolver system, etc.

Identifying a Best-Fit Resource Format Based on Device Capabilities

Once resolver core service 126 has selected a particular format category from each set of candidate format categories, resolver core service 126 identifies a specific resource format for each of the selected format categories. Resolver core service 126 identifies a particular resource format for a selected format category by selecting the resource format from the category that is the best fit for client device 110 based, at least in part, on the information from capability service 146. Resolver core service 126 identifies the one or more resource formats, from the selected format category, that client device 110 can access based on the capabilities information for client device 110.

According to an embodiment, if client device 110 can access multiple resource formats from a selected format category, then resolver core service 126 identifies the resource format for the target resource based on ranks of the resource formats that client device 110 can access. For example, an administrator includes, in metadata for the resource formats associated with each format category, rank information that ranks each resource format among the other resource formats for the category. Such rank information may be based on which resource format is the most popular for users from user feedback, which resource format is the most efficient to deliver or store, which resource format provides the best educational opportunities for users, etc.

In this embodiment, resolver core service 126 selects the resource format that is most highly ranked within the multiple resource formats. For example, the candidate format category is VIDEO and client device 110 can access the following resource formats associated with VIDEO: MOV (ranked 1); MP4 (ranked 3); and FLV (ranked 7). Based on the ranks of the accessible resource formats, resolver core service 126 selects MOV as the resource format for the target resource because MOV is the most highly ranked of the accessible resource formats.

According to embodiments, resolver core service 126 identifies a resource format for each selected candidate category, and compiles information on the selected resource format from each selected category for delivery to resolver plugin service 124, as indicated below.

Determining the Format in which the Target Resource is Stored

Returning to flowchart 200 of FIG. 2, at step 206, after selecting the format of the learning resource to deliver to the client device, it is determined whether the learning resource is stored at a resource repository in the selected format. For example, resolver core service 126 forwards information about the one or more selected resource formats to resolver plugin service 124 to determine whether the target resource is stored at resource database 160 in the one or more selected resource formats.

Resolver plugin service 124, or one or more selected resolver plugins of the set of resolver plugins 124A-N, requests information about the target resource from content and metadata provider (CMP) service 152. CMP service 152 provides access to resource database 160 by receiving and responding to requests for information about particular resources and to requests for the resources themselves. CMP service 152 responds to the request for information about the target resource with information, i.e., from resource database 160, that includes one or more of: resource formats in which the target resource is stored; locations of instances of the target resource; data files that encode the data of one or more target resource instances; title; description; author; runtime; etc.

Resolver plugin service 124, or the one or more selected resolver plugins, determines whether the target resource is stored in the one or more selected resource formats in resource database 160 from the information received from CMP service 152. In response to determining that the target resource is stored in the one or more selected resource formats in resource database 160, resolver plugin service 124 forwards information for the one or more instances of the target resource in the one or more selected resource formats to response builder service 128, as described in further detail below.

Identifying a Plugin for the Best-Fit Resource Format

At step 208 of flowchart 200, in response to determining that the learning resource is not stored at the resource repository in the selected format, the following steps are performed: select an instance of the learning resource, which is in a format other than the selected format, from the resource repository; and convert the selected instance of the learning resource to a converted instance of the learning resource in the selected format. For example, resolver plugin service 124 selects a particular resolver plugin of the set of resolver plugins 124A-N to process the target resource for a particular selected resource format. If resolver plugin service 124, or a selected resolver plugin, determines that the target resource is not stored in resource database 160 in the particular selected resource format, then processing by the plugin includes converting a particular instance of the target resource—that the plugin selects—into an instance of the target resource in the particular selected resource format.

Resolver plugin service 124 manages a set of two or more resolver plugins 124A-N, each of which correspond to a corresponding format category or, more specifically, to a corresponding resource format. A resolver plugin is configured to interface with CMP service 152 and to process resources for the corresponding format category or resource format. If a particular resource plugin is configured to process resources for a corresponding format category, resolver plugin service 124 sends information to the particular resource plugin, with a request to process a resource, indicating a particular resource format for which the resource is to be processed. For purposes of explanation below, the particular resource plugin corresponds to the resource format for which resolver plugin service 124 has sent the plugin instructions.

To process a particular resource, a particular plugin requests information about the particular resource from CMP service 152. The plugin uses information received from CMP service 152 to select a particular instance of the particular resource to either (a) make available to client device 110, in the case that the plugin is tasked with identifying whether the particular resource is stored in resource database 160 in the resource format that corresponds to the plugin; or (b) convert to a converted instance of the particular resource, in the resource format that corresponds to the plugin, to make available to client device 110. In the case that a plugin is tasked with identifying whether the particular resource is stored in resource database 160 in a resource format that corresponds to the plugin, the plugin is configured to identify an instance of the particular resource that is in the resource format that corresponds to the plugin.

To process the target resource for the particular selected resource format, resolver plugin service 124 selects a particular resolver plugin, from the set of two or more resolver plugins 124A-N, that corresponds to the particular selected resource format. This selection is simply a selection of the corresponding plugin if only one resolver plugin corresponds to the particular selected resource format or to a format category that is associated with the particular selected resource format. However, multiple resolver plugins of the set of resolver plugins 124A-N may be configured to process the same format category or resource format.

Each plugin of multiple resolver plugins that correspond to the same resource format or format category are registered, with resolver plugin service 124, as part of a particular plugin group. To register a resolver plugin as part of a plugin group, an administrator adds a group identifier for the plugin group to registration information for the resolver plugin maintained by resolver plugin service 124. Each plugin associated with a particular plugin group is also associated with rank information that ranks the plugin among the other plugins in the particular group.

Resolver plugin service 124 identifies a particular plugin, to process a resource for a selected resource format, from a group of plugins based on the rank information, i.e., resolver plugin service 124 selects the plugin with the highest rank in the group of plugins that correspond to the selected resource format. Group plugin rank information may be provided by an administrator. According to an embodiment, resolver plugin service 124 automatically sets and/or updates rank information based on information indicating the plugins' respective suitability for processing resources for the corresponding resource format, e.g., from user feedback, administrator feedback, etc. In an embodiment, rank information is further qualified by a resource format or format category of the resource to be processed. As such, rank information may be different depending on the resource format or format category of the resource to be processed. Furthermore, resolver plugin service 124 may be configured to select a lower-ranked plugin over a higher-ranked plugin a certain percentage of the time in order to get feedback information on how the lower-ranked plugin performs.

Converting the Target Resource to the Best-Fit Resource Format

To illustrate a resolver plugin converting an instance of the target resource into a particular selected resource format, resolver plugin service 124 selects resolver plugin 124A, which corresponds to a selected resource format, to process the target resource for a particular selected resource format. For example, resolver core service 126 has selected MOV as the resource format for the target resource.

Resolver plugin 124A requests information about the target resource from CMP service 152, which returns information indicating resource formats in which the target resource is stored. For example, CMP service 152 returns information indicating that two instances of the target resource are stored in resource database 160, as the resource formats MPEG and FLV, respectively. Resolver plugin 124A determines whether the target resource is stored in resource database 160 in the selected resource format, i.e., MOV. In this example, the target resource is not stored in resource database 160 as an MOV.

In response to determining that the target resource is not stored in resource database 160 as an MOV, resolver plugin 124A selects an instance of the resource, indicated in the information from CMP service 152, to convert to a converted instance of the target resource in the resource format MOV. In the case that resolver plugin 124A has the capability to convert MPEG resource instances to MOV format, but not FLV resource instances to MOV format, resolver plugin 124A selects the instance of the target resource that is in the convertible resource format, i.e., MPEG. According to embodiments, a plugin to converts resource instances from one resource format to another format via a conversion engine to which the plugin has access. Metadata associated with a conversion engine includes information indicating one or more of: one or more resource formats that are convertible by the engine; rank information that ranks multiple convertible resource formats by ease of conversion using the resource formats; one or more resource formats that the conversion engine can produce; etc.

In the case that resolver plugin 124A can use multiple of the stored formats to convert to MOV, then resolver plugin 124A uses selection rules and/or rank information associated with the multiple convertible resource formats to choose a particular instance of the target resource in a convertible resource format for converting to the selected format. For example, resolver plugin 124A includes information, e.g., in metadata for a conversion engine, that ranks MPEG as #1 easiest to convert, and FLV #2 easiest to convert. In this example, resolver plugin 124A selects the instance of the target resource that is in the MPEG resource format to convert to an MOV resource instance based on the rank information for the convertible resource formats.

Resolver plugin 124A performs conversion of the selected instance of the target resource to an instance of the target resource in the selected resource format, e.g., via a conversion engine. Continuing with the previous example, resolver plugin 124A converts the instance of the target resource that is in the MPEG resource format to a converted instance of the target resource in the MOV resource format. Resolver plugin 124A sends information for the converted resource instance to resolver plugin service 124, which forwards the information for the converted resource instance to response builder service 128.

As a further example, resolver core service 126 has selected MOV with closed captioning to be the resource format for the target resource. Resolver plugin service 124 selects a resolver plugin of the set of resolver plugins 124A-N that corresponds to MOV with closed captioning, e.g., plugin 124N. Plugin 124N performs conversion of a target resource instance to MOV format as described above. Additionally, in response to determining that the selected instance does not include information for closed captioning, plugin 124N converts the audio from the selected instance to subtitles, i.e., using an AUDIO to TEXT conversion engine, and includes that information in the converted target resource instance.

The examples above involve converting VIDEO resources to other resource formats in the VIDEO format category. However, plugins may be used to convert resources in resource formats associated with a particular format category into resource formats associated with a different format category. According to an embodiment, a plugin that is configured to process resources for a resource format associated with a particular format category is configured to convert instances of a resource that are in resource formats that correspond to a different format category, or to the particular format category, into the corresponding resource format.

In the case that resolver core service 126 has selected multiple resource formats in which the target resource is to be made available to client device 110, then resolver plugin service 124 selects a plugin of the set of plugins 124A-N for each of the selected resource formats, to process the target resource for each of the multiple selected resource formats. In this case, resolver plugin service 124 receives information from each selected plugin indicating a particular instance of the target resource to forward to response builder service 128.

An administrator may add or remove plugins from the set of resolver plugins 124A-N via resolver plugin service 124, e.g., at run-time. For example, resolver plugin service 124 maintains registration information for each resolver plugin in the set of resolver plugins 124A-N. An administrator may add a new resolver plugin to the set of resolver plugins 124A-N by making the new resolver plugin accessible to resolver plugin service 124 and registering information for the new resolver plugin with resolver plugin service 124. Registering information for a resolver plugin includes providing information about the plugin to resolver plugin service 124, including one or more of: a plugin name; a format category or resource format that the plugin is configured to process; a group identifier for the plugin; rank information for the plugin; etc. A newly-registered resolver plugin is available for processing resources without restarting the system or any part of the system, i.e., at the next request for processing a resource that resolver plugin service 124 receives after registering the new resolver plugin.

Generating a Response to the Request for the Learning Resource

At step 210 of flowchart 200, the learning resource, in the selected format, is made available to the client device by making the converted instance of the learning resource available to the client device. For example, resolver plugin service 124 receives information identifying one or more instances of the target resource, in one or more selected resource formats, from one or more plugins of the set of resolver plugins 124A-N. Resolver plugin service 124 sends information identifying the one or more instances of the target resource to response builder service 128. Response builder service 128 generates a response to the client request based on the received information, which response includes one or more of: location(s) at which learning client 112 may access the one or more target resource instances; identifier(s) that uniquely identify the one or more target resource instances to CMP service 152; etc. Response builder service 128 sends the generated response to learning client 112 on client device 110, thereby making the one or more instances of the target resource available for learning client 112 to access, i.e., via CMP service 152.

To illustrate, response builder service 128 receives information, from resolver plugin service 124, identifying a converted instance of the target resource with a unique identifier that uniquely identifies the instance of the target resource to CMP service 152. Resolver plugin service 124 may include other information in the communication to response builder service 128, e.g., the resource format of the target resource, a name of the target resource, etc. Response builder service 128 generates a response to the client request that includes, at least, the unique identifier of the target resource instance and sends the response to learning client 112. Learning client 112 submits a request for a resource instance identified by the unique identifier of the target resource instance to CMP service 152 for retrieval. In response to this request, CMP service 152 makes the target resource instance available to client device 110 for access by forwarding, to learning client 112, any information needed for client device 110 to access the target resource instance via an appropriate application or other mechanism.

As another illustration, response builder service 128 receives information for two or more instances of the target resource with: (a) corresponding unique identifiers that uniquely identify the instances of the target resource to CMP service 152, and (b) a resource format of each resource instance. Response builder service 128 generates a response to the client request that includes the unique identifiers of the target resource instances, and the resource formats of the target resource instances, and sends the response to learning client 112.

Learning client 112 displays information requesting selection, by a user, of a particular resource instance of the two or more instances of the target resource, e.g., via web page 116. Learning client 112 receives information indication user selection of a particular resource instance of the two or more resource instances. In response to receiving such information, learning client 112 submits a request for the selected resource instance, with the unique identifier of the selected resource instance, to CMP service 152 for retrieval. In response to this request, CMP service 152 makes the selected target resource instance available to client device 110 for access by forwarding, to learning client 112, any information needed for client device 110 to access the target resource instance via an appropriate application or other mechanism.

Gathering Information about Usage

When a user accesses a particular resource instance via CMP service 152, CMP service 152 sends information about the user activity to usage learner and analyzer (ULA) service 154. ULA service 154 also receives information about user activity directly from learning client 112, e.g., based on a set of user activity recording rules. For example, a particular user activity recording rule indicates that learning client 112 should send, to ULA service 154, information about a particular type of activity any time learning client 112 detects the activity. To illustrate, a particular type of activity may be: magnification of text over a certain percentage; failure of a user to complete a resource with related client context information, such as a network connection type; etc.

ULA service 154 determines what information to store in the user's profile based on one or more storage rules, and what information to analyze from the profile and information received about user activity based on one or more inference rules. Thus, ULA service 154 causes profile service 144 to store historical user activity information, which includes one or more of: requests made by a user; explicit indications of preference made by the user; selections made by the user, e.g., of particular resource formats; timestamps associated with user activity; completion of learning resources; partial completion of learning resources; the result of analysis performed on user activity information (both historical and present); indications of favored or disfavored resource formats or format categories; etc.

For example, at times, response builder service 128 sends information for two or more resource formats to learning client 112 for presentation to the user. ULA service 154 receives information indicating at least the resource formats presented to the user for selection, and the resource format that the user selected. ULA service 154 may also receive information indicating the target format category of the requested resource, and other information. Based on a storage rule, ULA service 154 causes profile service 144 to record the indication of user preference embodied in the user's resource format selection.

According to an embodiment, ULA service 154 uses received information to identify historical user tendencies. A historical user tendency is identified when a particular behavior is noted more than a threshold percentage of the time when the behavior is a possibility, which threshold percentage is indicated in an inference rule. To identify a historical user tendency, ULA service 154 requests historical user activity information from profile service 144 for inclusion in the analysis. Continuing with the previous example, based, at least in part, on the user's selection of a particular resource format and on an inference rule, ULA service 154 identifies a trend of user preference for the particular resource format over the other presented resource format. ULA service 154 causes the identified historical user tendency to be stored by profile service 144.

ULA service 154 also records client context information indicating one or more aspects of the client context at the time that particular information is noted. Such information informs under what circumstances the user made particular decisions or exhibited particular behaviors. ULA service 154 may identify particular aspects of client context that affect historical user trends or user preferences. For example, ULA service 154 determines that the user consistently prefers HD VIDEO when the user is on a 4G network or a WiFi network, and low bit-rate video when the user is on a 3G network. ULA service 154 causes at least the network type to be stored as part of the historical user behavior data in the user's profile based on a storage rule, which allows ULA service 154 to consider at least that aspect of client context when analyzing historical user tendencies or trends. Furthermore, ULA service 154 may determine that a user favors a particular format category or resource format no matter the client context.

Further, ULA service 154 infers information about a user's disabilities from received information and/or information stored in the user's profile. For example, ULA service 154 determines a historical user trend that, in over a threshold percentage of similar situations, the user prefers VIDEO or AUDIO resources over TEXT resources. ULA service 154 infers, based on an inference rule and the identified historical user trend, that there is a likelihood that the user has a reading disability. ULA service 154 then identifies another historical user trend indicating that the user scores significantly better on quizzes over material presented in a VIDEO or an IMAGE format than on quizzes over material presented in a TEXT format. From this second identified historical user trend and the previously determined likelihood that the user has a reading disability, and further based on a second inference rule, ULA service 154 determines that the likelihood of the user having a reading disability is significant. In response to this determination, ULA service 154 causes profile service 144 to record a reading disability in the user's profile.

Alternatives and Extensions

According to an embodiment, a user may request all possible formats of a particular resource. For example, learning client 112 may infer such a user request from a user request to change the format of an accessed learning resource. In this embodiment, resolver plugin service 124 polls all of the plugins of the set of resolver plugins 124A-N to identify a list of all possible resource formats for the particular resource. For example, resolver plugin service 124 sends a request to resolver plugin 124A for information identifying which resource formats resolver plugin 124A could produce for the particular resource. Resolver plugin 124A requests information for the particular resource from CMP service 152, as indicated above, and compiles a list of resource formats into which resolver plugin 124A could convert the particular resource based on the resource formats in which the particular resource is stored at resource database 160. Resolver plugin 124A forwards this list to resolver plugin service 124.

Resolver plugin service 124 compiles all of the resource formats into which the set of resolver plugins 124A-N could convert the particular resource, including the resource formats in which the particular resource is stored in resource database 160, into a master resource format list. Resolver plugin service 124 sends this list as a master resource format list to response builder service 128. Response builder service 128 sends the list to learning client 112 as a response to the client request.

Learning client 112 displays the list of resource formats, e.g., via web page 116. In response to receiving information indicating user selection of a particular format of the list of resource formats, learning client 112 generates a client request requesting the particular resource in the selected resource format and sends the new client request to request processor service 122. Request processor service 122 processes the new client request for the particular resource in the indicated resource format, as indicated above.

Furthermore, a response generated by response builder service 128 may include information about related resource formats that are accessible by client device 110. For example, response builder service 128 may include, in a response, information about all instances of the target resource that are stored at resource database 160 and that are accessible by client device 110. Such a response may indicate which of the included instances is a recommended resource instance, i.e., a resource instance that is in a selected resource format. As indicated above, learning client 112 may present the multiple indicated resource formats to the user for selection prior to accessing any instance of the target resource. Furthermore, after accessing a recommended instance of the target learning resource, learning client 112 may present information for all instances of the target resource that are stored at resource database 160 in resource formats that are accessible by client device 110 in response to a request, by the user, to change the format of the accessed target resource.

According to an embodiment, when a particular resource is presented to a user via an AUDIO format, client device 110 receives any user input via a speech recognition mechanism. For example, learning client 112 sends a request for a particular assessment resource to request processor service 122, and receives a response from response builder service 128 with information for an AUDIO format of the assessment resource. Client device 110 accesses the assessment resource in the AUDIO format. When the assessment resource requires user input, i.e., answers to assessment questions, client device 110 activates a mechanism for speech recognition through which the user may submit the user input. Similarly, client device 110 receives user input, i.e., discussion thread posts, via a speech recognition mechanism when a discussion thread is accessed in AUDIO format.

According to embodiments, the resource resolver system further customizes a resource that is to be delivered to a user based on a preferred natural language (i.e., a spoken language) for the user. For example, resolver core service 126 identifies information indicating a preferred natural language for a user in the user's profile information. Resolver core service 126 sends information indicating the user's preferred natural language to resolver plugin service 124. After resolver plugin service 124 selects one or more plugins to process the target resource and receives information for one or more instances of the target resource in the one or more selected resource formats, resolver plugin service 124 determines whether the one or more instances of the target resource are in the preferred natural language for the user.

According to embodiments, if an instance of the target resource of a selected resource format, for which resolver plugin service 124 has received information, is not in the preferred natural language of the user, resolver plugin service 124 determines, via CMP service 152, whether the target resource, in the selected resource format, is stored at resource database 160. If so, resolver plugin service 124 selects the instance of the target resource, in the selected resource format and in the preferred natural language, to deliver to the user and forwards information for that resource instance to response builder service 128.

According to embodiments, if an instance of the target resource in a selected resource format, for which resolver plugin service 124 has received information, is not in the preferred natural language of the user, resolver plugin service 124 identifies a plugin from the set of resolver plugins 124A-N to translate the instance of the target resource into the user's preferred natural language. For example, resolver plugin service 124 identifies a plugin 124B as capable of translating the instance of the target resource, in the instance's resource format, from the natural language of the resource instance to the user's preferred natural language. Resolver plugin service 124 forwards information identifying the translated instance of the target resource to response builder service 128.

Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

For example, FIG. 3 is a block diagram that illustrates a computer system 300 upon which an embodiment of the invention may be implemented. Computer system 300 includes a bus 302 or other communication mechanism for communicating information, and a hardware processor 304 coupled with bus 302 for processing information. Hardware processor 304 may be, for example, a general purpose microprocessor.

Computer system 300 also includes a main memory 306, such as a random access memory (RAM) or other dynamic storage device, coupled to bus 302 for storing information and instructions to be executed by processor 304. Main memory 306 also may be used for storing temporary variables or other intermediate information during execution of instructions to be executed by processor 304. Such instructions, when stored in non-transitory storage media accessible to processor 304, render computer system 300 into a special-purpose machine that is customized to perform the operations specified in the instructions.

Computer system 300 further includes a read only memory (ROM) 308 or other static storage device coupled to bus 302 for storing static information and instructions for processor 304. A storage device 310, such as a magnetic disk, optical disk, or solid-state drive is provided and coupled to bus 302 for storing information and instructions.

Computer system 300 may be coupled via bus 302 to a display 312, such as a cathode ray tube (CRT), for displaying information to a computer user. An input device 314, including alphanumeric and other keys, is coupled to bus 302 for communicating information and command selections to processor 304. Another type of user input device is cursor control 316, such as a mouse, a trackball, or cursor direction keys for communicating direction information and command selections to processor 304 and for controlling cursor movement on display 312. This input device typically has two degrees of freedom in two axes, a first axis (e.g., x) and a second axis (e.g., y), that allows the device to specify positions in a plane.

Computer system 300 may implement the techniques described herein using customized hard-wired logic, one or more ASICs or FPGAs, firmware and/or program logic which in combination with the computer system causes or programs computer system 300 to be a special-purpose machine. According to one embodiment, the techniques herein are performed by computer system 300 in response to processor 304 executing one or more sequences of one or more instructions contained in main memory 306. Such instructions may be read into main memory 306 from another storage medium, such as storage device 310. Execution of the sequences of instructions contained in main memory 306 causes processor 304 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical disks, magnetic disks, or solid-state drives, such as storage device 310. Volatile media includes dynamic memory, such as main memory 306. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 302. Transmission media can also take the form of acoustic or light waves, such as those generated during radio-wave and infra-red data communications.

Various forms of media may be involved in carrying one or more sequences of one or more instructions to processor 304 for execution. For example, the instructions may initially be carried on a magnetic disk or solid-state drive of a remote computer. The remote computer can load the instructions into its dynamic memory and send the instructions over a telephone line using a modem. A modem local to computer system 300 can receive the data on the telephone line and use an infra-red transmitter to convert the data to an infra-red signal. An infra-red detector can receive the data carried in the infra-red signal and appropriate circuitry can place the data on bus 302. Bus 302 carries the data to main memory 306, from which processor 304 retrieves and executes the instructions. The instructions received by main memory 306 may optionally be stored on storage device 310 either before or after execution by processor 304.

Computer system 300 also includes a communication interface 318 coupled to bus 302. Communication interface 318 provides a two-way data communication coupling to a network link 320 that is connected to a local network 322. For example, communication interface 318 may be an integrated services digital network (ISDN) card, cable modem, satellite modem, or a modem to provide a data communication connection to a corresponding type of telephone line. As another example, communication interface 318 may be a local area network (LAN) card to provide a data communication connection to a compatible LAN. Wireless links may also be implemented. In any such implementation, communication interface 318 sends and receives electrical, electromagnetic or optical signals that carry digital data streams representing various types of information.

Network link 320 typically provides data communication through one or more networks to other data devices. For example, network link 320 may provide a connection through local network 322 to a host computer 324 or to data equipment operated by an Internet Service Provider (ISP) 326. ISP 326 in turn provides data communication services through the world wide packet data communication network now commonly referred to as the "Internet" 328. Local network 322 and Internet 328 both use electrical, electromagnetic or optical signals that carry digital data streams. The signals through the various networks and the signals on network link 320 and through communication interface 318, which carry the digital data to and from computer system 300, are example forms of transmission media.

Computer system 300 can send messages and receive data, including program code, through the network(s), network link 320 and communication interface 318. In the Internet example, a server 330 might transmit a requested code for an application program through Internet 328, ISP 326, local network 322 and communication interface 318.

The received code may be executed by processor 304 as it is received, and/or stored in storage device 310, or other non-volatile storage for later execution.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A computer-executed method comprising:
   receiving, at a system from a client device, a request for a learning resource;
   wherein the request includes:
      user-specific information, and
      context information for the client device;
   in response to receiving the request, the system automatically performing:
      determining a target format category in which the learning resource is stored at a resource repository;
      determining a particular set of rules that are specific to the target format category;
      based, at least in part, on the user-specific information and the particular set of rules, selecting a plurality of candidate format categories;
      selecting a particular format category, from the plurality of candidate format categories, based at least in part on the context information for the client device;
      selecting a particular format, within the particular format category, based, at least in part, on the context information for the client device;
      after selecting the particular format:
         obtaining the learning resource in the particular format by either retrieving the learning resource from the repository in the particular format or converting the learning resource into the particular format; and
         making the learning resource, in the particular format, available to the client device;
   wherein the system comprises one or more computing devices.

2. The method of claim 1, wherein selecting the plurality of candidate format categories comprises:
   identifying user preference information based, at least in part, on the user-specific information;
   wherein the user preference information comprises one or more of:
      one or more preferred format categories in which to provide the learning resource, or
      a preferred format in which to provide the learning resource; and
   selecting the plurality of candidate format categories based, at least in part, on the user preference information.

3. The method of claim 2, wherein selecting the plurality of candidate format categories further comprises:
   selecting the plurality of candidate format categories based, at least in part, on the context information for the client device.

4. The method of claim 1, wherein the context information for the client device includes one or more of:
   a type of the client device;
   an operating system run on the client device;
   a type of a network connection of the client device;
   one or more applications running on the client device; and
   one or more applications not running on the client device.

5. The method of claim 1, wherein selecting the particular format comprises determining, based on the context information, one or more resource formats that the client device can access.

6. The method of claim 1, wherein:
   obtaining the learning resource is by converting the learning resource into the particular format;
   converting the learning resource into the particular format comprises:
      selecting an instance of the learning resource, which is in a format other than the particular format, from within the resource repository, and
      converting the selected instance of the learning resource to a converted instance of the learning resource in the particular format; and
   making the learning resource, in the particular format, available to the client device comprises making the converted instance of the learning resource available to the client device.

7. The method of claim 1, further comprising:
   identifying user disability information based, at least in part, on the user-specific information;
   wherein selecting the plurality of candidate format categories comprises: selecting the plurality of candidate format categories, based, at least in part, on the user disability information.

8. The method of claim 6, further comprising:
   maintaining a set of two or more resolver plugins;
   selecting a particular resolver plugin of the set of two or more resolver plugins based, at least in part, on the particular format;
   wherein the particular resolver plugin is configured to convert a resource instance to a converted resource instance in the particular format; and
   wherein the steps of selecting the instance of the learning resource and converting the selected instance are performed by the particular resolver plugin.

9. The method of claim 8, wherein selecting the particular resolver plugin further comprises:
   identifying a group of two or more resolver plugins, of the set of two or more resolver plugins;
   wherein the group of two or more resolver plugins corresponds to the particular format and includes the particular resolver plugin; and
   selecting the particular resolver plugin from the group of two or more resolver plugins based, at least in part, on rank information that ranks the particular resolver plugin among the other resolver plugins of the group of two or more resolver plugins.

10. The method of claim 8, further comprising:
    prior to selecting the particular resolver plugin:
       receiving information identifying the particular resolver plugin;
       wherein prior to receiving the information identifying the particular resolver plugin, the particular resolver plugin is not maintained in the set of two or more resolver plugins; and in response to receiving the information identifying the particular resolver plugin, causing the particular resolver plugin to be maintained in the set of two or more resolver plugins.

11. The method of claim 10, wherein causing the particular resolver plugin to be maintained in the set of two or more resolver plugins is performed at run-time.

12. One or more non-transitory computer readable media storing instructions which, when executed by one or more processors, cause:
receiving, at a system from a client device, a request for a learning resource;
wherein the request includes:
user-specific information, and
context information for the client device;
in response to receiving the request, the system automatically performing:
determining a target format category in which the learning resource is stored at a resource repository;
determining a particular set of rules that are specific to the target format category;
based, at least in part, on the user-specific information and the particular set of rules, selecting a plurality of candidate format categories;
selecting a particular format category, from the plurality of candidate format categories, based at least in part on the context information for the client device;
selecting a particular format, within the particular format category, based, at least in part, on the context information for the client device;
after selecting the particular format:
obtaining the learning resource in the particular format by either retrieving the learning resource from the repository in the particular format or converting the learning resource into the particular format; and
making the learning resource, in the particular format, available to the client device.

13. The one or more non-transitory computer readable media of claim 12, wherein selecting the plurality of candidate format categories comprises:
identifying user preference information based, at least in part, on the user-specific information;
wherein the user preference information comprises one or more of:
one or more preferred format categories in which to provide the learning resource, or
a preferred format in which to provide the learning resource; and
selecting the plurality of candidate format categories based, at least in part, on the user preference information.

14. The one or more non-transitory computer readable media of claim 12, wherein selecting the particular format comprises determining, based on the context information, one or more resource formats that the client device can access.

15. The one or more non-transitory computer readable media of claim 12, wherein the instructions further comprise instructions which, when executed by one or more processors, cause:
identifying user disability information based, at least in part, on the user-specific information;
wherein selecting the plurality of candidate format categories comprises: selecting the plurality of candidate format categories, based, at least in part, on the user disability information.

16. The one or more non-transitory computer readable media of claim 12, wherein:
obtaining the learning resource is by converting the learning resource into the particular format;
converting the learning resource into the particular format comprises:
selecting an instance of the learning resource, which is in a format other than the particular format, from within the resource repository, and
converting the selected instance of the learning resource to a converted instance of the learning resource in the particular format; and
making the learning resource, in the particular format, available to the client device comprises making the converted instance of the learning resource available to the client device.

17. The one or more non-transitory computer readable media of claim 16, wherein the instructions further comprise instructions which, when executed by one or more processors, cause:
maintaining a set of two or more resolver plugins;
selecting a particular resolver plugin of the set of two or more resolver plugins based, at least in part, on the particular format;
wherein the particular resolver plugin is configured to convert a resource instance to a converted resource instance in the particular format; and
wherein the steps of selecting the instance of the learning resource and converting the selected instance are performed by the particular resolver plugin.

18. The one or more non-transitory computer readable media of claim 17, wherein selecting the particular resolver plugin further comprises:
identifying a group of two or more resolver plugins, of the set of two or more resolver plugins;
wherein the group of two or more resolver plugins corresponds to the particular format and includes the particular resolver plugin; and
selecting the particular resolver plugin from the group of two or more resolver plugins based, at least in part, on rank information that ranks the particular resolver plugin among the other resolver plugins of the group of two or more resolver plugins.

19. The one or more non-transitory computer readable media of claim 17, wherein the instructions further comprise instructions which, when executed by one or more processors, cause:
prior to selecting the particular resolver plugin:
receiving information identifying the particular resolver plugin;
wherein prior to receiving the information identifying the particular resolver plugin, the particular resolver plugin is not maintained in the set of two or more resolver plugins; and
in response to receiving the information identifying the particular resolver plugin, causing the particular resolver plugin to be maintained in the set of two or more resolver plugins.

20. The one or more non-transitory computer readable media of claim 13, wherein selecting the plurality of candidate format categories further comprises: selecting the plurality of candidate format categories based, at least in part, on the context information for the client device.

21. The one or more non-transitory computer readable media of claim 12, wherein the context information for the client device includes one or more of:

a type of the client device;
an operating system run on the client device;
a type of a network connection of the client device;
one or more applications running on the client device; and
one or more applications not running on the client device.

22. The one or more non-transitory computer readable media of claim 19, wherein causing the particular resolver plugin to be maintained in the set of two or more resolver plugins is performed at run-time.

\* \* \* \* \*